(12) United States Patent  (10) Patent No.: US 7,505,639 B2
Shibasaki et al.  (45) Date of Patent: Mar. 17, 2009

(54) INFORMATION PRESENTATION METHOD AND INFORMATION PRESENTATION SYSTEM

(75) Inventors: Takao Shibasaki, Tokyo (JP); Yuichiro Akatsuka, Tama (JP); Yukihito Furuhashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 342 days.

(21) Appl. No.: 11/337,662

(22) Filed: Jan. 23, 2006

(65) Prior Publication Data

US 2006/0126968 A1 Jun. 15, 2006

Related U.S. Application Data

(63) Continuation of application No. PCT/JP04/10588, filed on Jul. 20, 2004.

(30) Foreign Application Priority Data

Jul. 24, 2003 (JP) ............... 2003-201055

(51) Int. Cl.
*G06K 9/54* (2006.01)
*G06K 9/36* (2006.01)
(52) U.S. Cl. .................... 382/306; 382/291
(58) Field of Classification Search ......... 382/306, 382/291, 226, 228, 195, 201
See application file for complete search history.

(56) References Cited

U.S. PATENT DOCUMENTS

| 4,742,558 | A | | 5/1988 | Ishibashi et al. |
| 5,765,561 | A | * | 6/1998 | Chen et al. ............... 600/407 |
| 6,535,243 | B1 | * | 3/2003 | Tullis ..................... 348/207.1 |
| 2002/0145709 | A1 | | 10/2002 | Shibasaki et al. |
| 2004/0046779 | A1 | * | 3/2004 | Asano et al. ............. 345/716 |

FOREIGN PATENT DOCUMENTS

| JP | 2002-92012 | 3/2002 |
| JP | 3086823 | 4/2002 |
| JP | 2002-157575 | 5/2002 |

* cited by examiner

*Primary Examiner*—Yon Couso
(74) *Attorney, Agent, or Firm*—Scully, Scott, Murphy & Presser P.C.

(57) ABSTRACT

An information presentation method is to photograph an object by use of an image input device and display related information corresponding to the object on the object in a display screen or the periphery of the object in the display screen. The related information of the object is expressed by the contents of expression of a plurality of two-dimensional markers set on the object or the periphery of the object and the plurality of two-dimensional markers correspond to any one of a plurality of information series.

5 Claims, 5 Drawing Sheets

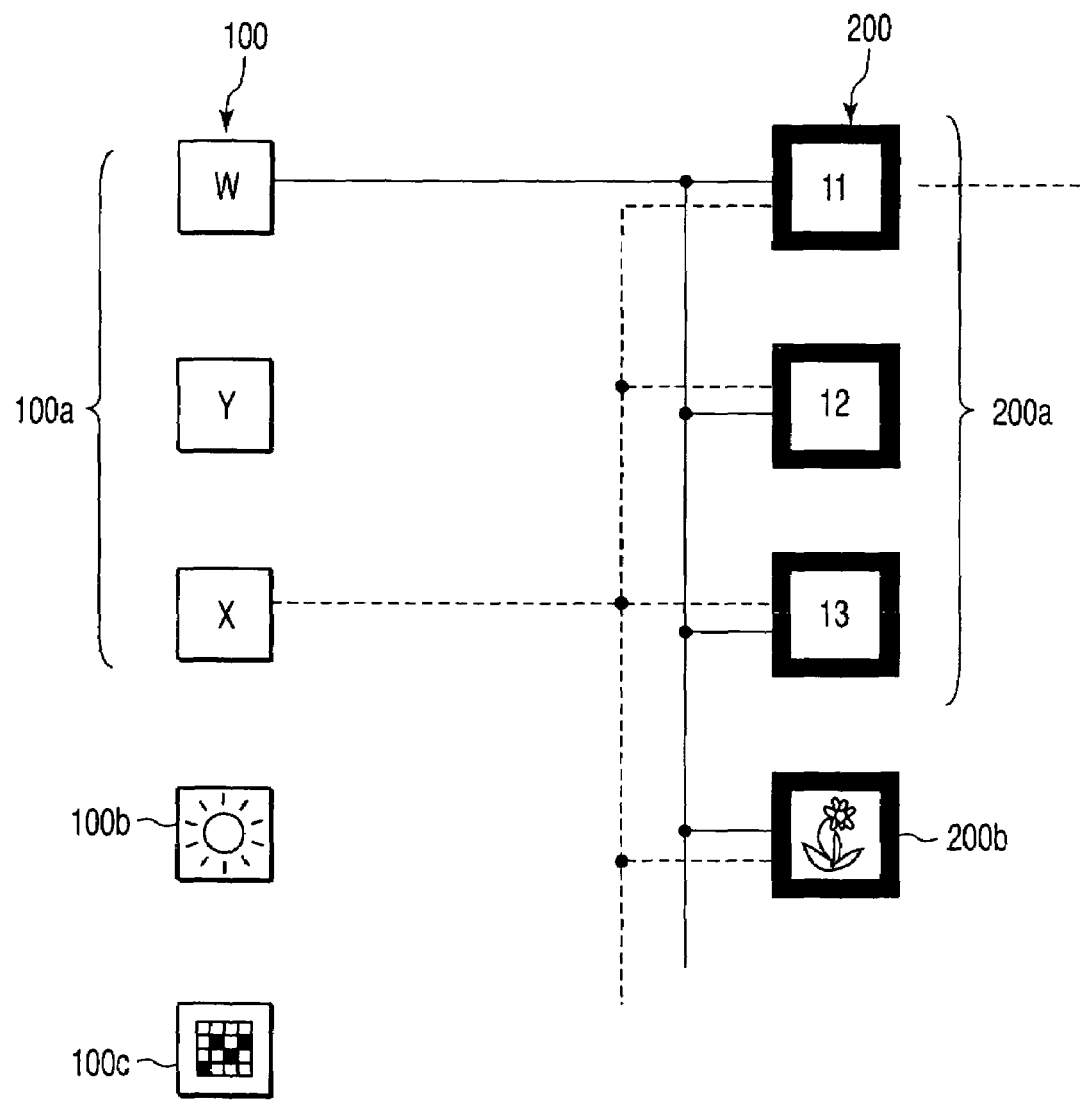
F I G. 3

INFORMATION PRESENTATION METHOD AND INFORMATION PRESENTATION SYSTEM

CROSS REFERENCE TO RELATED APPLICATIONS

This is a Continuation Application of PCT Application No. PCT/JP2004/010588, filed Jul. 20, 2004, which was published under PCT Article 21(2) in Japanese.

This application is based upon and claims the benefit of priority from prior Japanese Patent Application No. 2003-201055, filed Jul. 24, 2003, the entire contents of which are incorporated herein by reference.

BACKGROUND OF THE INVENTION

1. Field of the Invention

The present invention relates to an information presentation method and information presentation system using markers.

2. Description of the Related Art

As an information presentation apparatus which presents preset related information with respect to an object of the real world and/or predefined marker, a barcode reader is generally well known. Among them, there is provided an apparatus which presents information by use of spatial information of the object and/or predefined marker. For example, in Jpn. Pat. Appln. KOKAI Publication No. 2000-82107, it is disclosed that a two-dimensional code printed on a calling card is read by use of a camera, an ID is analyzed according to a program in a computer, and a face photograph of a person corresponding to the ID is displayed on a display of the computer as if it lies beside the two-dimensional code on the calling card. FIG. 7 shows one example of display disclosed in the above Publication, 1 denotes a calling card, 2 denotes a two-dimensional code, 3 denotes a computer display and 4 denotes a face photograph.

The barcode reader informs an operator of success or failure of recognition by making a sound, for example, when the predetermined barcode is correctly recognized. Generally, since the barcode reader attains an object of "reading information and presenting information meant by it" if the barcode reader once recognizes it, it becomes possible to inform the operator of a state of achievement of the object without fail if a function of making a sound or the like is provided.

On the other hand, in the object of the real world and/or predetermined marker, in an information presentation apparatus which analyzes spatial location information thereof and outputs preset related information, it is not sufficient if an object and a predetermined marker are once recognized and it is necessary to continuously recognize them and continuously output preset related information. Since the spatial location information is analyzed and related information is presented, for example, it is necessary to continue to always and adaptively present correct information even if the positional relation between the information presentation apparatus and the object and predetermined marker is changed with time.

Further, in the case of a barcode, when an article is scanned by use of a laser beam in a register or the like of a supermarket, a marker ID can be recognized with relatively high precision, but characters, design, icon or the like is used as an ID in many cases in order to permit a marker to be recognized not only by a mechanical device but also by a human being.

Since they are subjected to a recognition process not by laser scanning but by an image input device, an error recognition rate increases between the markers if a large number of markers are set.

An apparatus disclosed in Jpn. Pat. Appln. KOKAI Publication No. 2000-82107 is an information presentation apparatus which outputs preset related information by inputting an image of a predetermined marker, analyzing spatial location information thereof and recognizing an expressed ID, but it is understood that a marker and preset information are simply set in one-to-one correspondence. Since the spatial location information is used to serve the purpose of displaying a photograph beside the two-dimensional code on the calling card, a correct recognition rate can be attained to some extent in many cases even if a large number of markers (two-dimensional codes) are set by fetching the same by use of an image input device.

BRIEF SUMMARY OF THE INVENTION

According to a first aspect of the present invention, there is provided an information presentation method comprising:

photographing an object by an image input device, and displaying related information corresponding to the object on the object in a display screen or the periphery of the object in the display screen, wherein the related information of the object is expressed by contents of expression of a plurality of two-dimensional markers arranged on the object or the periphery of the object and the plurality of two-dimensional markers belong to any one of a plurality of information series.

According to a second aspect of present invention, there is provided an information presentation method comprising:

photographing an object by an image input device, and displaying related information of the object in a superimposed form on the object on a display screen according to a plurality of two-dimensional markers arranged on the object or the periphery of the object, wherein the plurality of two-dimensional markers arranged on the object or the periphery of the object have a hierarchical semantic structure.

According to a third aspect of the present invention, there is provided an information presentation method according to the second aspect, wherein a range of the information series is displayed in the display screen when the contents of expression of the two-dimensional markers express an upper hierarchical information series.

According to a fourth aspect of the present invention, there is provided an information presentation method which includes mounting image input means on a portable information terminal and calculating a position and direction of the portable information terminal based on a photographed image by the image input means when various information items are presented from the potable information terminal to a user, and searching for information related to the object and presenting the same to the user according to the position and direction of the portable information terminal and the result of specification of an opposing object, comprising:

detecting a marker group which is used to specify the object, is set to correspond to any one of a plurality of information series and is a marker group containing characters, designs and code information items set on the object or the periphery of the object, and searching for related information specified by a marker corresponding to a lower information series based on specifying information of an upper information series among the plurality of information series.

According to a fifth aspect of the present invention, there is provided an information presentation method according to the first or fourth aspect, wherein the marker group is set to be effective only in a predetermined object scene, object region or object time period.

According to a sixth aspect of the present invention, there is provided an information presentation method according to claim 1 or 4, wherein the marker group contains an upper hierarchical marker and a lower hierarchical marker and the lower hierarchical marker is independently used for information presentation when only the lower hierarchical marker is detected without detecting the upper hierarchical marker.

According to a seventh aspect of the present invention, there is provided an information presentation method according to the first or second aspect, wherein a plurality of information series are contained in the single marker display.

According to an eighth aspect of the present invention, there is provided an information presentation method according to the seventh aspect, wherein the two-dimensional marker is configured by a marker frame portion and a frame peripheral portion indicating internal and external portions of the frame portion, the frame marker portion is used for positional attitude detection of the portable information terminal and the frame peripheral portion is used for formation of display information.

According to a ninth aspect of the present invention, there is provided an information presentation system which presents various information items from a portable information terminal to a user, which comprises:

positional attitude measuring means for calculating a position and direction of the portable information terminal based on a photographed image photographed by image input means mounted on the portable information terminal, information acquiring means for acquiring information associated with an object based on the result of specification of an opposing object and the position and direction of the portable information terminal calculated by the positional attitude measuring means, and display means for displaying the information associated with the object acquired by the information acquiring means for the user, which comprises marker detecting means for detecting a marker group used to specify the object and including characters, designs or code information items set on an object or the periphery of the object based on the photographed image, wherein the marker group corresponds to any one of a plurality of information series and related information specified by a marker corresponding to a lower information series is searched for based on specifying information of an upper information series among the plurality of information series.

BRIEF DESCRIPTION OF THE SEVERAL VIEWS OF THE DRAWING

FIG. 3 is a diagram for illustrating one concrete example of the hierarchical structure of two-hierarchical markers;

DETAILED DESCRIPTION OF THE INVENTION

Figure 1:
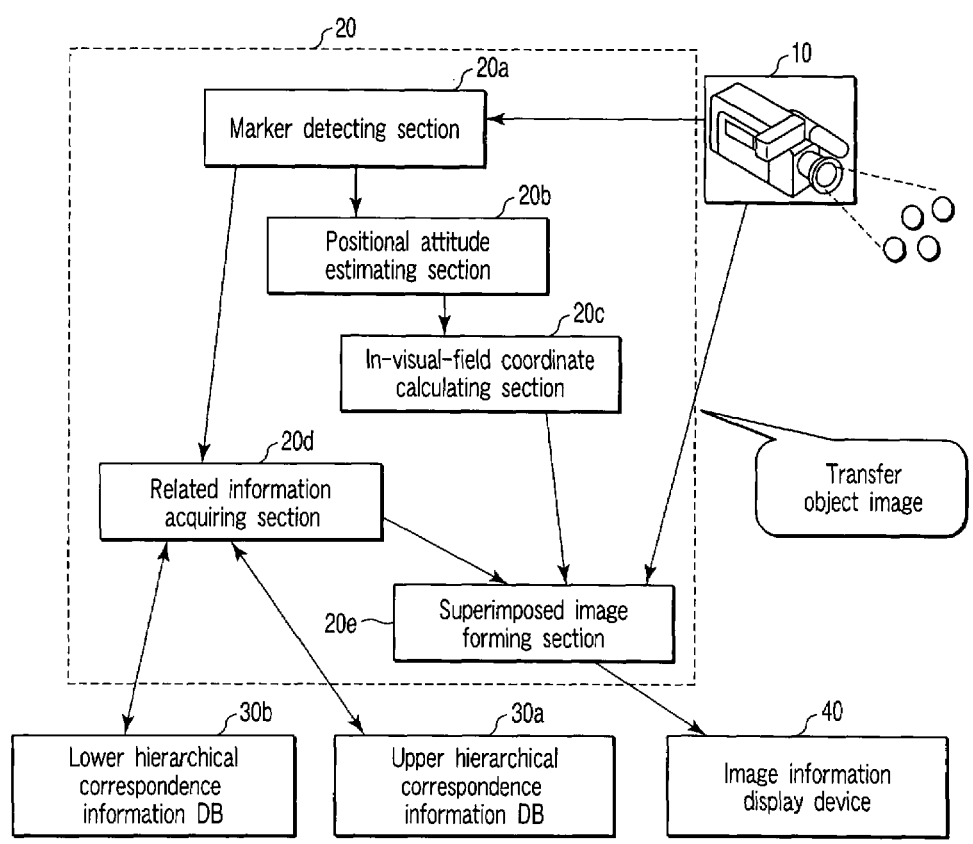
FIG. 1 is a diagram showing the schematic configuration of an information presentation system to which this invention is applied.

There will now be described the outline of the present embodiment. It is possible to photograph a marker and display an object of the real world and specified related information associated with the object in a superimposed form in the same screen based on information obtained from the marker. In this case, the object of the real world is something which already exists in the real world, for example, a structure such as a building or house, a natural object such as a tree or the like, an artificial object such as a signal, pipe or furniture.

Further, it is assumed that the marker indicates various code information items, numerals, characters and symbols artificially set for an output of the information presentation apparatus and surrounded by frames. However, when an object itself of the real world is registered as a marker (landmark) for an output of the information presentation apparatus, it is assumed that it can be dealt with as a marker in the same manner.

Specifically, a marker is configured by a frame portion of a predetermined shape and a symbol or design containing characters written in the internal portion or external portion (peripheral portion) thereof. Then, it is possible for the marker to mainly have two functions including a positional attitude computing function of photographing the shape of a frame by an image input device and computing the photographing position based on distortion of the shape in the screen thereof and a display information formation function of recognizing the characters, symbols, design and code information described before and decoding information or program to be displayed in a superimposed form by using preset wording or attaching meanings or reading out desired information. (When markers of different information series are recognized, the information presentation contents are determined by the combination thereof.)

By the way, it is sometimes desired to display a large number of objects and a large number of information items. For example, in a factory or the like, it is simply required to provide markers of 100 types or more if there are spots of 100 or more which provide display in a superimposed fashion. However, the processing ability of a mobile type computer is generally low, a camera mounted thereon is small and light, and the resolution thereof is generally low. In such a system environment, it becomes difficult to determine markers of a large number exceeding 100 types and there occurs a problem that the error recognition rate becomes high.

Further, it is possible to enhance the recognition rate of a marker by a human being by using numerals or alphanumeric characters of two or more digits in comparison with markers using cross-sectional codes for identification in a factory or the like, but in this case, there occurs a problem that the rate of error recognition between characters, for example, B and 3 or 8 or S and 5 becomes high.

Therefore, in this invention, in a system which attaches related information to an object and displays the same in a superimposed form, the related information of the object is expressed by the contents of expression of a plurality of markers set on the object or the periphery of the object and the plurality of markers are set to belong to any one of a plurality of information series. That is, the related information finally displayed in a superimposed fashion is specified by the plurality of information series. Particularly, in this case, the marker is set to have a hierarchical semantic structure, information (series) in the upper hierarchy is first acquired by detecting the marker of the upper hierarchy which indicates the conceptual range or spatial range containing the object, and then a marker of a lower hierarchy is set to specify an information series in a range or field specified by the upper hierarchy when the marker of the lower hierarchy is detected. With this configuration, even when the markers of the lower hierarchy are the same, the contents to be specified or displayed are attained from different information series and supplied to a display system to be displayed in the superimposed form if the markers of the upper hierarchy previously detected are different.

In other words, in the present embodiment, plural types of markers are classified into a plurality of information series, a group of objects is roughly classified by use of markers of the upper hierarchy among the markers of the plurality of information series and related information items associated with individual objects are specified and displayed by use of the markers of the lower hierarchy so that the required number of markers can be significantly reduced and the error recognition rate of the markers can be lowered.

For example, it becomes easy to recognize an area by recognizing the upper hierarchical marker by use of a computer terminal having a camera mounted thereon in a factory or the like and display information related to an object in which the user is interested in a position corresponding to the object in the same screen as that of the object in a superimposed fashion in the above area by continuously recognizing lower hierarchical markers.

In this case, the information series of the upper hierarchical marker is used as an ID to instruct the existence position on the classification, for example, "room" or "periphery of a large-scale apparatus" where the user exists, but it is of course possible for the marker to have a function of instructing "user's direction" in addition to "position".

Further, as described before, the marker has the positional attitude computing function and display information forming function, but in this case, a three-dimensional positional attitude of the input device is detected by use of the positional attitude computing function of the lower hierarchical marker without providing the positional attitude computing function for the upper hierarchical marker by taking it into consideration that the markers are classified into the hierarchical form.

Next, the embodiment of this invention is explained in detail with reference to the accompanying drawings. FIG. 1 is a diagram showing the schematic configuration of an information presentation system to which this invention is applied and it includes an image input device 10 which photographs and inputs an object and markers (in this example, a first hierarchical marker and a lower hierarchical marker set near the object), an image processing device 20 which subjects the input photographed image to an image process which will be described later, an upper hierarchical correspondence information database (DB) 30a and lower hierarchical correspondence information database (DB) 30b used when the image processing device 20 searches for related information of the object, and an image information display device 40 which is used to display image information formed by the image processing device 20.

The image processing device 20 includes a marker detecting section 20a, positional attitude estimating section 20b, in-visual-field coordinate calculating section 20c, related information acquiring section 20d, and superimposed image forming section 20e. Further, in the upper hierarchical correspondence information database (DB) 30a, information associated with the upper hierarchical marker group is stored and, for example, link data (specification of the lower hierarchical information series) indicating the link destination of the lower hierarchical correspondence information DB is stored for each upper hierarchical marker. Further, in the lower hierarchical correspondence information DB 30b, information associated with the lower hierarchical marker group is stored and, for example, an information series in which lower hierarchical markers are set to correspond to related information items of objects is stored for each link destination from each upper hierarchical marker.

In the present embodiment, the upper hierarchical correspondence information and lower hierarchical correspondence information are stored in different DBs, but the upper and lower hierarchical correspondence information items can be stored in one DB.

In the system configuration described above, first, a marker is photographed by the image input device 10 and input to the image processing device 20. The marker detecting section 20a of the image processing device 20 recognizes the type of a marker for each of the upper and lower hierarchical markers by detecting the characteristic point of the input marker. The related information acquiring section 20d searches for the link destination in the lower hierarchical DB 30b of the recognized upper hierarchical marker by referring to the upper hierarchical correspondence information DB 30a. Next, it searches for a lower hierarchical marker in the searched link destination by referring to the lower hierarchical correspondence information DB 30b, acquires corresponding related information and supplies the same to the superimposed image forming section 20c.

On the other hand, the marker recognition result in the marker detecting section 20a is also input to the positional attitude estimating section 20b and the position and direction of the image input device 10 are estimated. The in-visual-field coordinate calculating section 20c calculates the in-visual-field coordinate used to determine the position in the screen in which related information is displayed based on the estimation result in the positional attitude estimating section 20b and supplies the same to the superimposed image forming section 20c.

The superimposed image forming section 20c superimposes related information from the related information acquiring section 20d on the image of the object input from the image input device 10 to form a superimposed image. The formed superimposed image is displayed by the image information display device 40.

Figure 2:
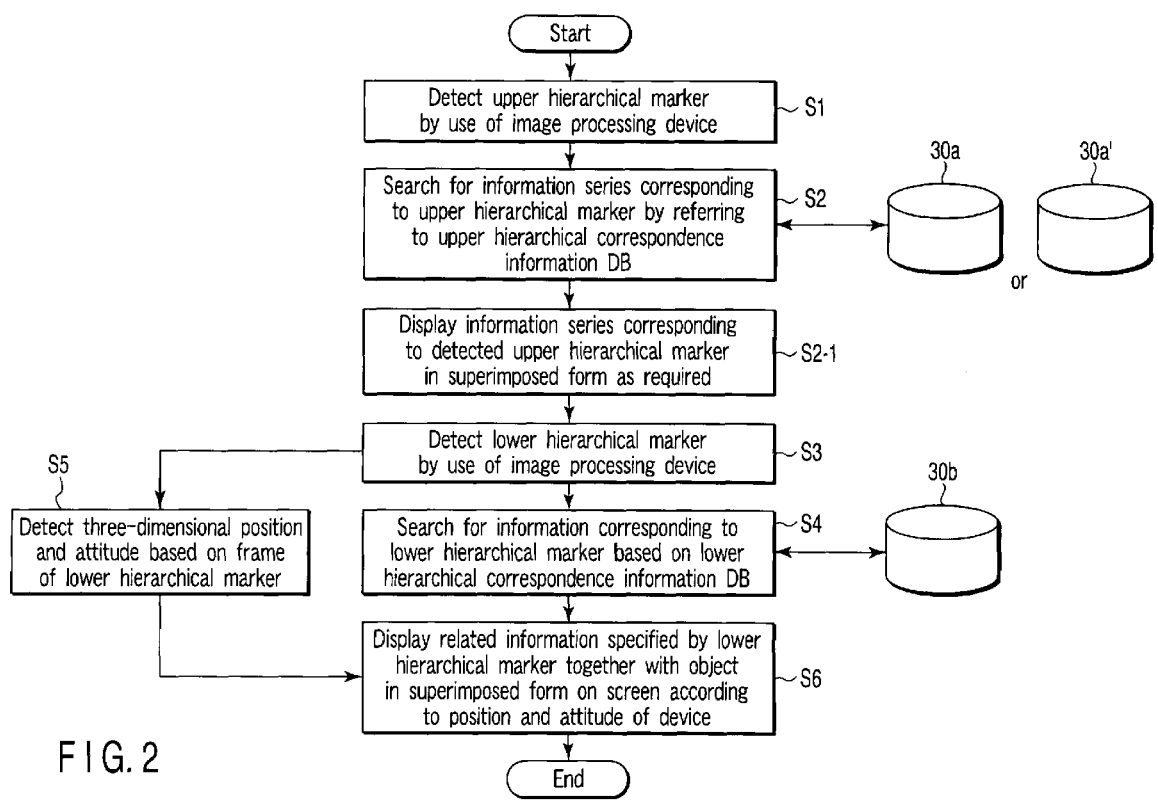
FIG. 2 is a flowchart for illustrating the procedure until related information of an object is displayed in a superimposed form by an information presentation system of the present embodiment.

FIG. 2 is a flow chart for illustrating the procedure until related information of an object is displayed in a superimposed form by the information presentation system of the present embodiment.

First, an input upper hierarchical marker is detected by the marker detecting section 20a in the image processing device 20 (step S1). Next, the related information acquiring section 20d searches for an information series corresponding to the upper hierarchical marker by referring to the upper hierarchical correspondence information DB 30a (or an address DB 30a' of the upper hierarchical correspondence information) (step S2).

Next, it displays a range of an information series corresponding to the detected upper hierarchical marker in a superimposed fashion as required (step S2-1). Then, it detects an input lower hierarchical marker by use of the marker detecting section 20a of the image processing device 20 (step S3). Next, it searches for related information corresponding to the detected lower hierarchical marker based on the lower hierarchical correspondence information DB 30b (step S4). In parallel with this, it calculates the three-dimensional position and attitude of the image input device 10 based on an image of a frame portion of the detected lower hierarchical marker (step S5). Then, it displays related information specified by the lower hierarchical marker together with an object by the image information display device 40 according to the three-dimensional position and attitude of the image input device 10 (step S6).

FIG. 3 is a diagram for illustrating one concrete example of the hierarchical structure of two-hierarchical markers. An upper hierarchical marker 100 is configured by an information series configured by alphanumeric characters 100a of W, Y, Z, design 100b and two-dimensional barcode 100c. Further, a lower hierarchical marker 200 is configured by an information series configured by alphanumeric characters 200a of 11, 12, 13 and design 200b. Further, "W" which is one of the upper hierarchical marker 100 and "X" which is the other one of the upper hierarchical marker 100 correspond to the same lower hierarchical marker 200.

With the above hierarchical structure, when a case wherein the alphanumeric characters "11" in the lower hierarchical marker 200 is detected after the alphanumeric character "W" in the upper hierarchical marker 100 is detected and a case wherein the alphanumeric characters "11" in the lower hierarchical marker 200 is detected after the alphanumeric character "X" in the upper hierarchical marker 100 is detected are considered, different related information items can be set to correspond to the alphanumeric characters "11" since the markers in the upper hierarchy are different although each of the markers detected in the lower hierarchy is the alphanumeric characters "11".

Further, in a case where the lower hierarchical marker is detected while the upper hierarchical marker is not detected, it is assumed that an information series corresponding to the lower hierarchical marker is displayed.

Figure 4:
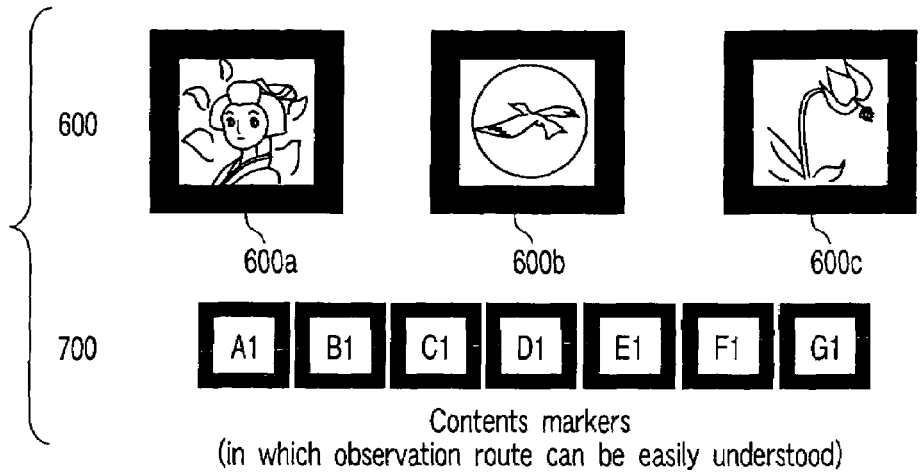
FIG. 4 is a diagram showing a concrete example of two-hierarchical markers when this invention is applied to an exhibition room or tourist spot.

FIG. 4 is a diagram showing a concrete example of two-hierarchical markers when this invention is applied to an exhibition room or tourist spot (information transmitting base). As an upper hierarchical marker 600, area markers such as a station square area 600a, "Yumeji" monument area 600b, "Tsubakimoto Hana" residence area 600c and the like which specify information transmitting areas are shown. As a lower hierarchical marker 700, alphanumeric markers A1, B1, C1, D1, E1, F1, G1 as contents markers used to determine information to be transmitted are shown. In this case, different contents can be transmitted by making the upper hierarchical markers 600 different even if the markers in the lower hierarchical marker 700 are kept the same.

Further, particularly, the number of variations in the display can be increased by adjusting DB information corresponding to the lower hierarchical marker in limited time or limited region (area).

Figure 5:
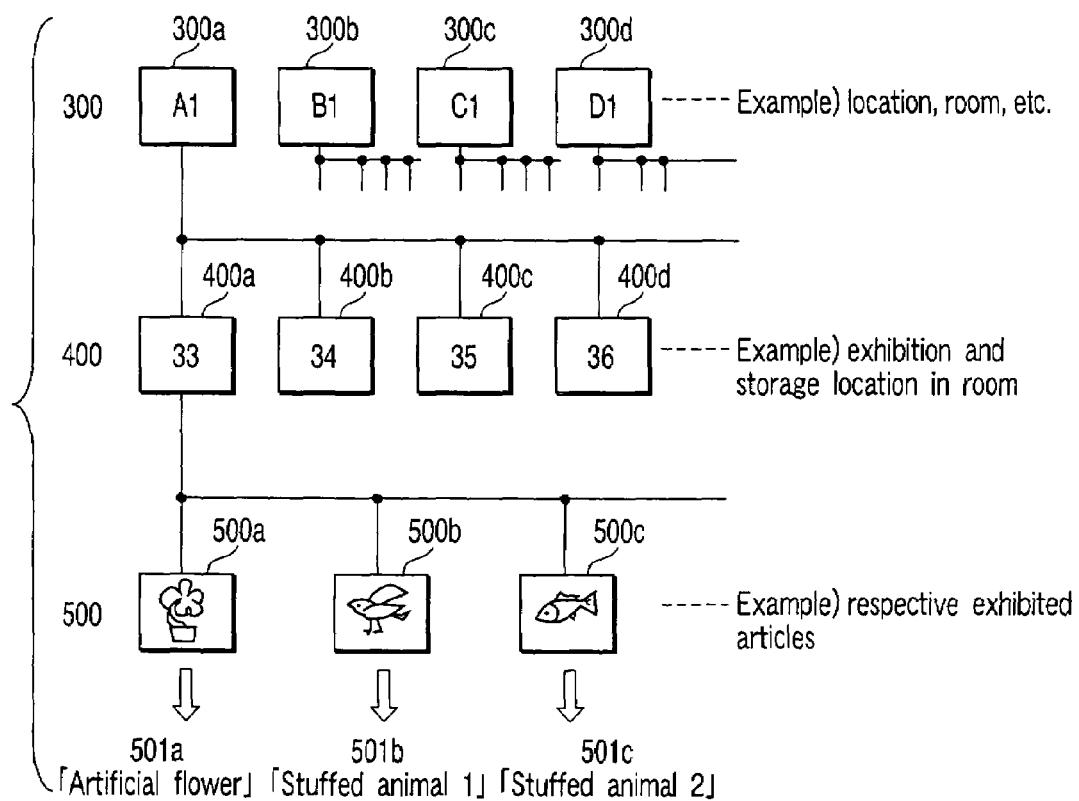
FIG. 5 is a diagram for illustrating the concrete hierarchical structure of three-hierarchical markers.

FIG. 5 is a diagram for illustrating the concrete hierarchical structure of three-hierarchical markers. In the case of the two-hierarchical markers, the terms of the upper hierarchical marker and lower hierarchical marker are used, but in three-hierarchical markers, the terms of a first hierarchical marker, second hierarchical marker and third hierarchical marker are used.

First hierarchical markers 300 are alphanumeric markers expressing locations, rooms and the like, and in the drawing, "A1" expresses an exhibition room 300a, "B1" a lobby 300b, "C1" a machine room 300c, and "D1" a library 300d.

Various types of second hierarchical markers are set to correspond to each of the first hierarchical markers, but in FIG. 5, only the second hierarchical markers corresponding to the exhibition room 300a are shown. As the alphanumeric markers expressing the exhibition places and storage locations in the exhibition room 300a, "33" expresses a locker A (400a), "34" a locker B (400b), "35" a shelf 1 (400c), and "36" a shelf 2 (400d).

Third hierarchical markers are set to correspond to each of the respective second hierarchical markers, but in FIG. 5, only the third hierarchical markers for the locker A (400a) are shown. As design markers expressing respective exhibited articles, design markers 500a, 500b, 500c are shown in the drawing. The respective design markers 500a, 500b, 500c correspond to an "artificial flower" as an object 501a, a "stuffed animal 1" as an object 501b and a "stuffed animal 3" as an object 501c.

Figures 6A, 6B:
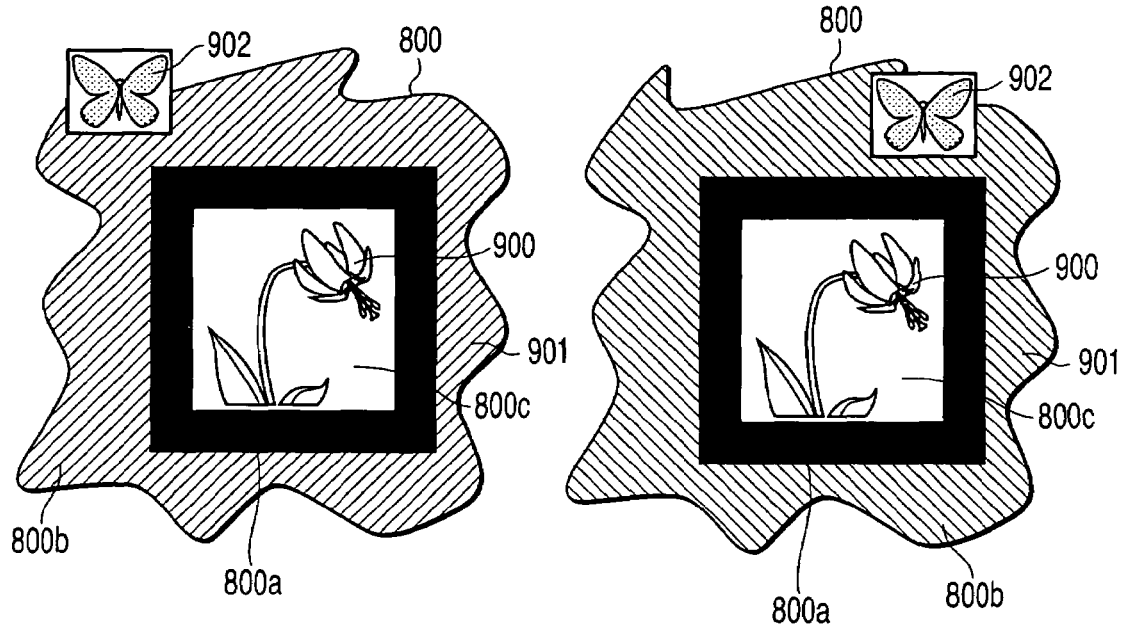
FIGS. 6A and 6B are views showing one example in which a plurality of information series are contained in a single marker.
Figure 7:
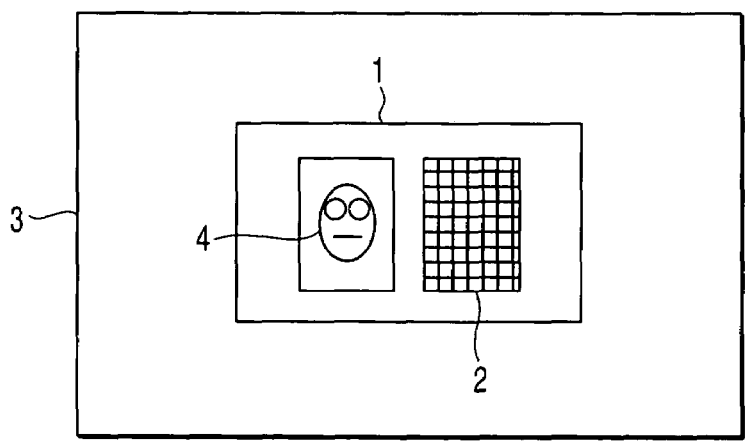
FIG. 7 is a view for illustrating one example of the conventional information presentation apparatus.

FIGS. 6A and 6B are views showing one example in which a plurality of information series are contained in a single marker. Two markers 800 shown in the drawing are configured by a marker frame portion 800a, interior-of-frame portion 800c and exterior-of-frame portion 800b and have an information series 900 in the interior-of-frame portion 800c and information series 901, 902 in the exterior-of-frame portion 800b. In this case, the information series 900 of the interior-of-frame portions 800c of the two markers 800 are the same, but it is possible to display different related information items by making different the information series 901, 902 of the exterior-of-frame portions 800b (in this case, by making the colors of the information series 901 different and making the positions of the information series 902 different). In this case, desired one of the information series 900 of the interior-of-frame portion 800c and the information series 901, 902 of the exterior-of-frame portion 800b can be set in the upper hierarchical marker (or lower hierarchical marker).

It is possible to set the markers so that they will become effective only in a predetermined object scene, object area or object time period. When a signboard of a convenience store chain or the like is set in a lower hierarchical marker, common information can be set for display without recognizing the upper hierarchy.

According to the embodiment described above, the number of markers used to display related information items in a superimposed fashion can be significantly reduced, and as a result, the error recognition rate can be reduced. For example, it is assumed that at least 300 information presentation spots are set in a facility such as a large-scale plant, shopping mall or the like. When an information series is set to correspond to each marker and the markers have no hierarchical structure, 300 types of markers are required as a matter of course.

However, when the marker expression is made by use of alphanumeric characters of two or three digits, error recognition tends to occur between similar numerals. Further, a lot of labor is required for setting of an image input device, illuminating environment and recognition determination step in order to reduce the error recognition and this becomes a factor of a cost increase. Further, in a portable information terminal, judging from the machine power thereof, it is extremely difficult to make a discrimination between 50 or more design markers.

However, the number of markers used can be significantly reduced by forming the markers in a hierarchical form as described above. For example, when the hierarchical structure is formed by using markers of eight areas as the first hierarchical markers, markers of eight zones as the second hierarchical markers and markers of six spots as the third hierarchical markers, information presentation spots of 8×8×6=378 spots can be attained by use of 8+8+6=22 markers.

According to this invention, the number of markers used can be reduced and the error recognition rate can be significantly reduced.

What is claimed is:

1. An information presentation method comprising:

photographing an object by an image input device, and displaying related information of the object in a superimposed form on the object on a display screen according to a plurality of two-dimensional markers arranged on the object or the periphery of the object, the related information being decided by a combination of the plurality of two-dimensional markers, wherein the plurality of two-dimensional markers arranged on the object or the periphery of the object have a hierarchical semantic structure.

2. The information presentation method according to claim 1, wherein a range of the information series is displayed in the display screen when the contents of expression of the two-dimensional markers express an upper hierarchical information series.

3. An information presentation method which includes mounting image input means on a portable information terminal and calculating a position and direction of the portable information terminal based on a photographed image by the image input means when various information items are presented from the portable information terminal to a user, and searching for information related to the object and presenting the same to the user according to the position and direction of the portable information terminal and the result of specification of an opposing object, comprising:

detecting a marker group which is used to specify the object. the marker group containing characters, designs or code information items set on the object or the periphery of the object, and searching for related information specified by a combination of markers in the marker group, wherein the marker group contains an upper hierarchical marker and a lower hierarchical marker and the lower hierarchical marker is independently used for information presentation when only the lower hierarchical marker is detected without detecting the upper hierarchical marker.

4. An information presentation method comprising:

photographing an object by an image input device, and displaying related information corresponding to the object on the object in a display screen or the periphery of the object in the display screen, wherein the related information of the object is expressed by a combination of a plurality of two-dimensional markers arranged on the object or the periphery of the object, wherein each marker of the plurality of two-dimensional markers is configured by a frame marker portion and a frame peripheral portion indicating internal and external portions of the frame portion, the frame marker portion is used for positional attitude detection of the portable information terminal and The frame peripheral portion is used for formation of display information.

5. An information presentation system which presents various information items from a portable information terminal to a user, which comprises:

a positional attitude measuring portion for calculating a position and direction of the portable information terminal based on a photographed image photographed by an image input portion mounted on the portable information terminal;

an information acquiring portion for acquiring information associated with an object based on the result of specification of an opposing object and the position and direction of the portable information terminal calculated by the positional attitude measuring portion;

a display for displaying the information associated with the object acquired by the information acquiring portion for the user; and a marker detecting portion for detecting a marker group used to specify the object and including characters, designs or code information items set on an object or the periphery of the object based on the photographed image, wherein the marker group consists of markers having a hierarchical semantic structure, and the speculation of the object in the information acquiring portion is performed based on the combination of a marker in higher hierarchy and a marker in lower hierarchy.

* * * * *